May 12, 1959     E. R. OVERTON     2,886,317
PLAYGROUND DEVICE RESEMBLING A TURTLE
Filed Oct. 29, 1956
FIG_1_
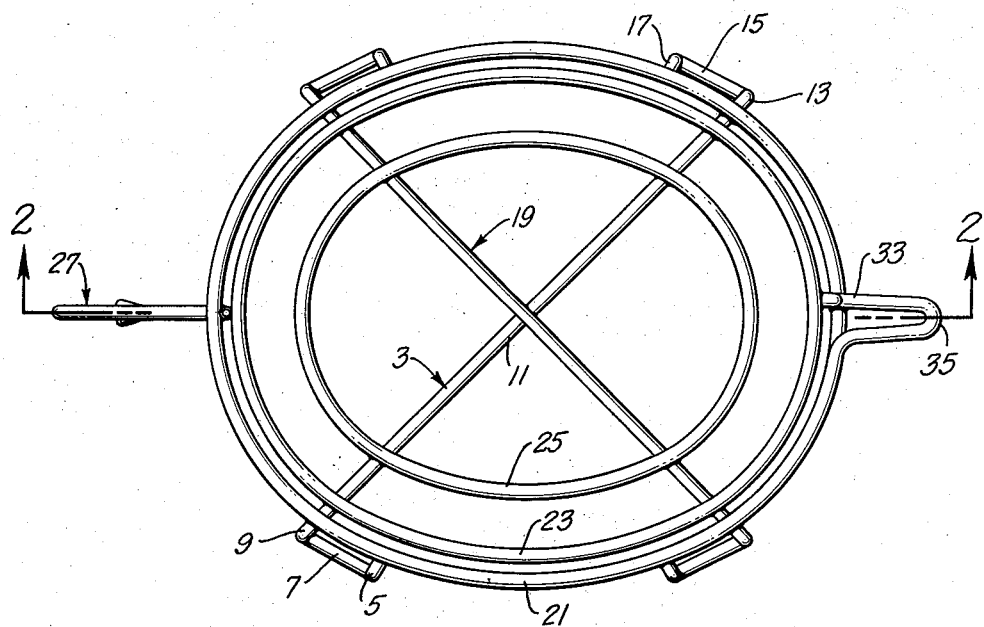
FIG_2_
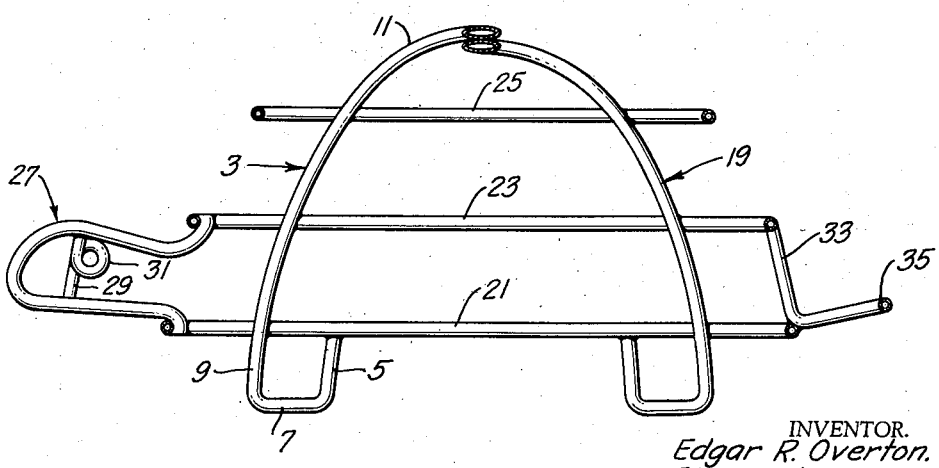
INVENTOR.
Edgar R. Overton.
BY ECKHOFF & SLICK, Attys
A member of the firm.

United States Patent Office 2,886,317
Patented May 12, 1959

2,886,317

PLAYGROUND DEVICE RESEMBLING A TURTLE

Edgar R. Overton, Oakland, Calif.

Application October 29, 1956, Serial No. 618,844

1 Claim. (Cl. 272—60)

This invention relates to a playground device which is in the form of a turtle, and, more particularly relates to a playground device of the type which children can crawl over and which is constructed of a series of pipe sections or similar structural materials.

In recent years, playground devices have become popular which provide activity for children in the form of climbing devices, and such devices have more play value if they are in the form of some recognizable animal or object.

In accordance with the present invention, a climbing device is made in the form of a hollow body of a turtle, the device being made of pipe sections so that the children can climb over, through and around the device. The device may be constructed of welded steel pipe sections and is thus almost indestructible.

In the drawings forming a part of this application:

Figure 1 is a plan view of the device of the present invention.

Figure 2 is a sectional view on the lines 2—2 of Figure 1.

Referring now to the drawings by reference characters, the device of the present invention is made from a series of pipe sections. One section, generally designated 3, is turned upwardly as at 5 to form the rear portion of a front leg, then runs parallel to the ground as at 7 to form a support and then turns upwardly as at 9 to form the front portion of the front leg, passes over the back of the animal as at 11, then forms the rear portion of the opposite rear leg at 13, then runs parallel to the ground to form the support member 15 and then upwardly as at 17 to form the front portion of the rear leg. The other two legs of the animal and a corresponding back member are formed in exactly the same manner by the member generally designated 19.

Three oval pipes of decreasing diameter then connect the members 3 and 19 to form the outline of the body. These have been designated 21, 23 and 25. The horizontal members 21, 23 and 25 form convenient climbing members and add to the rigidity of the structure as a whole.

At the front of the turtle, a head, generally designated 27, is formed of pipe, and is welded to the members 23 and 21, as is shown. In addition, cross member 29 is provided which is curved to form an eye 31. Also connected between the members 21 and 23 is the pipe 33 which is curved as at 35 to simulate a tail.

Although the present invention is not predicated on the size or materials of the parts, in one practical embodiment of the invention the turtle was 9 feet long and 2½ feet wide, and stood 4 feet high. The device was made entirely of galvanized steel pipe 1¼" in diameter, and was welded at all of the points of crossing of the various pipes. Obviously, the device could be made in the form more flattened or more upright than that illustrated. Further, the device could be made of rods, bars or tubes, riveted or bolted together.

I claim:

A playground toy for climbing comprising: a plurality of vertically stacked arcuate endless pipes, said pipes being arranged in spaced parallel horizontal planes and in order of constantly ascending size with the smallest of said pipes being uppermost, said arcuate pipes encompassing and being fixedly secured directly in contact with the exterior of a support therefor, said support consisting of two generally semicircular pipes each mounted in a generally vertical plane at right angles to one another and crossing at the center-most point of each, each of said pipes having terminal ends bent at about right angles to the adjacent vertical portions of said supporting pipes whereby to provide supporting feet for said playground toy.

References Cited in the file of this patent

UNITED STATES PATENTS

| | | |
|---|---|---|
| D. 130,746 | Oermann | Dec. 16, 1941 |
| 2,648,539 | Packer | Aug. 11, 1953 |

FOREIGN PATENTS

| | | |
|---|---|---|
| 925,096 | Germany | Mar. 10, 1955 |